United States Patent [19]

Szablikowski et al.

[11] Patent Number: 5,446,107
[45] Date of Patent: Aug. 29, 1995

[54] METHOD FOR THE PREPARATION OF CATIONIC, WATER-SOLUBLE POLYMERS AND THEIR USE

[75] Inventors: Klaus Szablikowski, Walsrode; Wolfgang Koch, Bomlitz; Heinrich Leffers, Walsrode; Hans-Günter Poersch-Panke, Walsrode; Branislav Boehmer, Walsrode, all of Germany

[73] Assignee: Wolff Walsrode Aktiengesellschaft, Walsrode, Germany

[21] Appl. No.: 259,702

[22] Filed: Jun. 14, 1994

[30] Foreign Application Priority Data

Jun. 21, 1993 [DE] Germany ............ 43 20 433.3

[51] Int. Cl.$^6$ .................................... C08F 8/00
[52] U.S. Cl. .......................... 525/385; 525/328.2
[58] Field of Search .................................. 525/385

[56] References Cited

U.S. PATENT DOCUMENTS

| | | |
|---|---|---|
| 4,806,591 | 2/1989 | Probst et al. ............ 524/820 |
| 4,885,345 | 12/1989 | Fong . | |
| 4,895,621 | 1/1990 | Hassler ............ 525/385 |
| 4,970,290 | 11/1990 | Fong ............ 525/385 |
| 5,041,503 | 8/1991 | Duplaise et al. ............ 525/385 |

FOREIGN PATENT DOCUMENTS

| | | |
|---|---|---|
| 57597/69 | 4/1971 | Australia . |
| 0238729 | 9/1987 | European Pat. Off. . |
| 1595333 | 4/1970 | Germany . |
| 1948755 | 4/1970 | Germany . |
| 1285609 | 8/1972 | United Kingdom . |

OTHER PUBLICATIONS

Research Disclosure, Apr. 1980, p. 140; #19211: "Alkene oxide quaternaries of mannich derivates polyacrylamide".

*Primary Examiner*—Bernard Lipman
*Attorney, Agent, or Firm*—Sprung Horn Kramer & Woods

[57] ABSTRACT

A method for the preparation of water-soluble, cationic amine polymers by the continuous or batch-wise reaction of a polymer having primary, secondary or tertiary amine functions in its side chain or primary chain as a starting material, wherein the reaction is carried out with an epoxide, a glycidyl ether or a mixture of different epoxides and glycidyl ethers in aqueous solution without additional solvent at a temperature of 30° to 90° C. and at a pH of 8 to 14 within 3 to 30 minutes, the epoxides or glycidyl ethers are added as one batch or in portions, and after adjusting the pH of the aqueous solution of the cationic polymer, which is >13.5 after the reaction with epoxide or glycidyl ether, using a mineral or carboxylic acid, the product solution is obtained without additional work-up steps.

7 Claims, No Drawings

METHOD FOR THE PREPARATION OF CATIONIC, WATER-SOLUBLE POLYMERS AND THEIR USE

This invention relates to a method for the batch-wise and continuous preparation of water-soluble, cationic polymers and their use as cationic dispersing agents for pigments and fillers which are preferably used in the paper industry, and as retention and dewatering agents.

Cationic, water-soluble polymers have a diversity of uses. Mention should be made of their use in cosmetics, as retention and dewatering agents and as fixing agents for deleterious substances in paper manufacture. Cationic, water-soluble polymers are also being used to an increasing extent as dispersing agents for fillers, such as kaolin and calcium carbonate in the paper industry, for example. The advantages of cationically dispersed filler systems compared with anionically dispersed systems include, for example, a reduced usage of retention and dewatering agents, a reduced usage of fixatives for deleterious substances and of fixing agents, and improved printability and higher strength of the paper (Wochenblatt für Papierfabrikation [*Paper Manufacturing Weekly Bulletin*] 1984, page 799; and 1988, page 176). Their sole disadvantage at present is the high price of such products. In principle, cationic, water-soluble polymers can be prepared by two routes. The first route is the polymerisation of cationic monomers by the usual methods. The second possibility is the transformation of non-cationic polymers. Non-cationic polymers mainly contain primary, secondary or tertiary nitrogen groups, which are converted to quaternary—and thus cationic—amine functions by reaction with an alkylating agent. Numerous methods have been described for this purpose.

According to Research Disclosure 19 211, April 1980, cationic polymers can be obtained by the reaction of N-aminomethacrylamide, or polymers prepared therefrom as a water-in-oil emulsion, where the monomer or polymer being located in the aqueous disperse phase, with ethylene oxide at 15° to 20° C. In this reaction ethylene oxide is introduced as a gas over two hours, the pH is maintained constant during the reaction by the addition of acid, and the batch has to be stirred overnight. The disadvantages of this method are the long reaction time, the presence of aliphatic hydrocarbons as a continuous phase, and the presence of emulsifying agents which are environmentally unacceptable and which have to be separated off if the polymers are to be used for the above-mentioned applications. Moreover, the above-mentioned products are not free from chlorine or chlorides, which is to be avoided from an environmental point of view.

According to DE 34 32 569 and DE 29 48 795, cationic, water-soluble polymers can be obtained by reacting the reaction products of acrylonitrile homopolymers and copolymers with polyamines with alkyl halides. Disadvantages include the introduction of halogen, residual alkylating agents in the product, and the relatively long reaction time when the usual inexpensive alkyl chlorides are used as alkylating agents. Moreover, the choice of the anion is limited with this method.

The object of the present invention is to provide water-soluble, cationic polymers having any desired anions apart from the halogens, from water-soluble polymers having primary, secondary or tertiary amine groups in the side chain or in the primary chain, wherein the method of preparation is advantageous in terms of its environmental aspects, i.e. no hydrocarbons or emulsifying agents are used and thus no liquid or solid waste is produced, and is advantageous in terms of its economic aspects, i.e short reaction times, high space-time yields and no work-up stages. The method may be carried out both continuously and batch-wise.

This object is achieved according to the invention by the reaction of an aqueous polymer solution, wherein the polymer contains primary, secondary or tertiary amine groups in the side chain or in the primary chain and may also be present as a cross-linked polymer.

The aqueous solution of a polymer which contains primary, secondary or tertiary amine groups in the side chain or in the primary chain is reacted at a temperature of 30° to 90° C. and at a pH of 8 to 14 with an epoxide, a glycidyl ether or with a mixture of different epoxides or glycidyl ethers over a period of 3 to 30 minutes. The reaction is either conducted as a batch process, wherein the total amount of epoxide is added as one batch or in several parts, or as a continuous process, wherein a reactor without back-mixing is used. After 3 to 30 minutes the pH is adjusted to the desired value using a mineral acid or carboxylic acid, wherein a halogen-containing acid is not used.

It has surprisingly been found that the epoxide or the glycidyl ether undergoes practically no hydrolysis under these conditions of temperature and pH in the aqueous solution, and that more than 99 % of the epoxide, glycidyl ether or mixture of different epoxides or glycidyl ethers which is employed has reacted with the polymer.

The first component for the preparation of the quaternary, cationic, water-soluble polymers comprises polymers in the form of a 5 to 60 weight % aqueous solution, which contain primary, secondary or tertiary amine function in the side chain or the primary chain, such as reaction products of PAN homopolymers and copolymers, for example, with polyamines. The comonomer which is used, for,example, may be acrylamide, acrylic acid and its esters, such as acrylic acid methyl ester, acrylic acid ethyl ester or acrylic acid butyl ester for example, or its hydroxyalkyl esters, such as 2-hydroxyethyl acrylate or 2-hydroxypropyl acrylate, for example, or maleic acid, fumaric acid or methacrylamide, or methacrylic acid and its esters such as methacrylic acid methyl ester, methacrylic acid ethyl ester or methacrylic acid butyl ester, for example, and also its hydroxyalkyl esters, such as 2-hydroxyethyl methacrylate or 2-hydroxypropyl methacrylate for example, or dimethylaminoethyl acrylate, dimethylaminoethyl methacrylate, diethylaminoethyl acrylate, diethylaminoethyl methacrylate, vinyl acetate, N-vinyl pyrrolidone, N-vinyl imidazole, vinyl propionate or vinyl butyrate, for example. Different reactive amine functions must be present in the polyamine, e.g. 3-aminopropyl morpholine, N-(3-aminopropyl-)diethanolamine, N,N-dimethyl-1,3-propanediamine, N-methyl-1,3-propanediamine, N-methyl ethylene diamine, N,N-dimethyl ethylene diamine. The polymers can also be obtained by the polymerisation of ethylenically unsaturated monomers by the usual routes by homopolymerisation or copolymerisation with monomers, such as acrylamide for example, acrylic acid and its esters, such as acrylic acid methyl ester, acrylic acid ethyl ester or acrylic acid butyl ester, for example, and its hydroxyalkyl esters, such as 2-hydroxyethyl acrylate or 2-hydroxypropyl acrylate, for example, maleic acid, fumaric acid, methacrylamide, methacrylic acid and its esters, such as methacrylic acid methyl ester, methacrylic acid ethyl ester or methacrylic acid butyl ester, for example, and also its hydroxyalkyl esters, such as 2-hydroxyethyl methacrylate or 2-hydroxypropyl methacrylate for example, dimethylaminoethyl acrylate, dimethylaminoethyl methacrylate, diethylaminoethyl acrylate, diethylaminoethyl methacrylate, diethylaminoethyl acrylate, diethylaminoethyl methacrylate, vinyl acetate, N-vinyl pyrrolidone, N-vinyl imidazole, vinyl propionate or vinyl butyrate, for example. The polymers which contain primary, secondary or tertiary amine functions usually exhibit a pH in aqueous solution which is in the basic region.

The second component for the preparation of the quaternary, cationic, water-soluble polymers comprises 0.1 to 10 molar equivalents, based on the amine functions, of an epoxide or epoxide mixture or a glycidyl ether, a glycidyl ether mixture or an epoxide/glycidyl ether mixture. $C_2$ to $C_4$ epoxides are preferably used; if the compound is to contain hydrophobic groups, $C_{14}$ to $C_{18}$ epoxides are preferably used, mostly in combination with $C_2$ to $C_4$ epoxides. In one preferred embodiment comprising reaction with $C_{14}$ to $C_{18}$ epoxides, the $C_{14}$ to $C_{18}$ epoxides are added first and the $C_{14}$ to $C_4$ epoxides are added later.

The third component is a mineral acid or a carboxylic acid, wherein a halogen-containing acid may not be used for the preparation of halogen-free or halide-free products. The following may be used as acids, for example: sulphuric acid, sulphurous acid, phosphoric acid, phosphonic acid, phosphorous acid, formic acid, oxalic acid, acetic acid and citric acid. The amount of acid depends on the desired pH of the product solution. A pH range of 5 to 8 is preferred for the aqueous product solution.

After the addition of the epoxide, the epoxide mixture, the glycidyl ether, the glycidyl ether mixture or the epoxide/glycidyl ether mixture, the pH of the aqueous polymer solution mostly increases to values around 12 to 14, and surprisingly practically no hydrolysis of the epoxide or glycidyl ether occurs to form the corresponding alcohols. According to the general reaction procedure, the polymer, which contains primary, secondary or tertiary groups in the side chain or primary chain, is heated in the form of a 5 to 60 weight % aqueous solution to 30° to 90° C. and 0.1 to 10 molar equivalents, based on the primary, secondary and tertiary amine function, of the epoxide, glycidyl ether or the mixtures are added as a liquid. When low molecular weight epoxides, such as ethylene oxide or propylene oxide for example, are added, this has to be effected under a pressure of 2 to 5 bar in order to liquefy these epoxides, since they are gaseous at normal pressure. The reaction can be identified by an increase in temperature and is finished after 3 to 30 minutes. The pH of the aqueous solution of the cationic polymer is adjusted to the desired pH value, preferably to a pH between 5 and 8, using one of the above-mentioned acids.

One preferred embodiment is the reaction of a crosslinked product formed from an acrylonitrile homomer or copolymer and an N,N-dialkyl aminoalkylamine with a) 0.1 to 0.5 molar equivalents, based on the primary, secondary and tertiary amine functions in the polymer, of a $C_{14}$ to $C_{18}$ epoxide at 60° to 80° C., and subsequent reaction with b) 0.5 to 2 molar equivalents, based on the primary, secondary and tertiary amine functions in the polymer, of a $C_2$ to $C_4$ epoxide at 30° to 80° C., ethylene oxide being particularly preferred, and subsequent adjustment of the pH value using a carboxylic or mineral acid, as cited above, to pH 5 to 8.

Another preferred embodiment is the reaction of reaction products formed from a polyacrylonitrile homopolymer or copolymer and an N,N-dialkyl aminoalkylamine with ethylene oxide and/or propylene oxide at 30° to 60° C., wherein the pH of the aqueous educt solution is between 8 and 10, the ethylene oxide/propylene oxide is added under a pressure of 2 to 5 bar, the pH of the reaction solution is adjusted after 5 to 10 minutes using one of the above-mentioned acids.

In each case an aqueous solution of the cationic polymer is obtained, which can be used directly without further purification steps, or after additional cross-linking by the usual methods with a bifunctional compound such as epihalohydrins for example, as a dispersing agent for pigments and fillers, as a fixative for deleterious substances in paper manufacturing, as a retention and dewatering agent, as a thickener or as a flocculant, for example.

The reaction is advantageously conducted either in a batch reactor or in a continuously operated reactor with little or no back-mixing.

In the case of a batch reactor, the aqueous polymer solution is introduced and the epoxide or the glycidyl ether or the mixtures are added as one batch or in several portions. When a plurality of epoxides or glycidyl ethers is used, it is advantageous, in order to adjust certain properties of the product, to add the different epoxides or glycidyl ethers successively and to await until the reaction has finished each time before adding the further educts. Thus in order to produce the desired product with the desired degree of hydrophilicity, it is advantageous, for example, to add a long-chain epoxide first, such as a $C_{14}$ to $C_{18}$ epoxide for example, and to add a short-chain epoxide later, such as ethylene oxide and/or propylene oxide for example, since the latter are more reactive and thus the amine function would react with ethylene oxide or propylene oxide and not with the $C_{14}$ to $C_{18}$ epoxides if the addition were made simultaneously. The pH is adjusted in the same reaction vessel after the reaction has finished.

If the reaction is to be carried out continuously, a reactor with little or no back-mixing should be selected. Such reactors comprise, for example, horizontally or vertically disposed flow tubes with baffles, such as static mixers, packed bodies or packings for example, or may comprise columns such as sieve plate columns, packed columns and the like. The 5 to 60 weight % aqueous polymer solution is fed into the reactor continuously by means of a suitable pump. Just downstream of the inlet point for the polymer solution there is a nozzle or a gas distributor through which the epoxide or the glycidyl ether is introduced into the aqueous polymer solution. In order to obtain good mixing of the educts, it may be advisable to install a static mixer, for example, just downstream of the inlet point for the epoxide or glycidyl ether. If a plurality of different epoxides or glycidyl ethers is to be added, it is advisable to make metered additions of the individual epoxides or glycidyl ethers at different points. The pH-of the continuously forming product solution is likewise continuously adjusted, e.g. by the pH-controlled metered addition of one of the above-mentioned acids. For this purpose a static mixer is provided in the reaction tube downstream of the acid metering point, in order to ensure intimate mixing. A pH electrode, via the measured value of which the metered addition of the acid is controlled, is provided downstream of the mixer.

The invention will be described in more detail with reference to the following examples.

EXAMPLE 1

363 g of a poly-N,N-dimethylaminopropyl acrylamide with a molecular weight of 12,400 ($M_w$) were dissolved in 303 g water and reacted with 191.5 g glycidol for 30 minutes at 70° C. After 30 minutes glycidol could no longer be detected (GC). The pH of the solution was adjusted to pH 6 with $H_2SO_4$. 972 g of a 67.5 % aqueous solution of poly-N,N-dimethyl-N-(2,3-dihydroxypropyl)-N-acrylamidopropyl ammonium sulphate was obtained. Its structure was confirmed by $^{13}C$ NMR.

EXAMPLE 2

1500 g of a 34.7 weight % aqueous solution of a poly-N,Nmethylaminopropyl acrylamide were thermally equilibrated in a 5 litre steel autoclave at 40° C., and 165 g ethylene oxide were then added under a pressure of 4 bar. The temperature rose to 60° C. within 2 minutes and then slowly fell back again. 10 minutes after the ethylene oxide addition the pH was adjusted to 5.0 using $H_2SO_4$. 1830 g of a 34% solution of poly-N,N-dimethyl-N-2-hydroxyethyl-N-acrylamidopropyl ammonium sulphate were obtained. Its structure was confirmed by $^{13}C$ NMR. Ethylene oxide could no longer be detected; the content of ethylene glycol and higher homologues was <0.5% (GC).

EXAMPLE 3

1500 g of a 34.7% aqueous solution of a poly-N,N-dimethylaminopropyl acrylamide were heated to 80° C. in a 5 litre steel autoclave with 80 g hexadecyl-1,2-oxirane and reacted for 30 minutes at this temperature. The reaction mixture was then cooled to 40° C. and 132 g ethylene oxide under a pressure of 4 bar were added to this reaction mixture. After 10 minutes the pH of the solution was adjusted to pH 6 using formic acid. 2120 g of a 41.6% solution of poly-N,N- dimethyl-N-2-hydroxyhexadecyl-N-acrylamidopropyl ammonium formate-Co-N,N-dimethyl-N-2-hydroxyethyl-N-acrylamidopropyl ammonium formate were obtained. Its structure was confirmed by $^{13}C$ NMR.

Comparative Example 1

312 g of a dried poly-N,N-dimethylaminopropyl acrylamide with a molecular weight of 5300 ($M_w$) and 965 g isopropanol which had been dried over magnesium methylate were reacted with 137 g methyl chloride for 7 hours at 100° C. in the autoclave. 4.5% of the methyl chloride used was still unreacted after 7 hours. The polymer was precipitated out in acetone in order to separate it from residual alkylating agents. 406 g of a solid polymer were obtained (corresponding to 80% conversion).

Comparative Example 2

5070 g of a 55 weight % solution in isopropanol of a poly-N,N-dimethylaminopropyl acrylamide with a molecular weight of 12,400 ($M_w$) were reacted with 1350ml chloroethanol and 2422 ml isopropanol for 7 hours at 70° C. 10 % of the original amount of chloroethanol was still unreacted after 7 hours.

Comparative Example 3

180 g of a dried poly-N,N-dimethyiaminopropyl acrylamide with a molecular weight of 12,400 ($M_w$) were added to 420 ml water and 95 g chloroethanol and reacted for 7 hours at 70° C. 15% of the original amount of chloroethanol was still unreacted after 7 hours.

We claim:

1. A method for the preparation of water-soluble, cationic amine polymers by the continuous or batch-wise reaction of a non-cationic polymer having primary, secondary or tertiary amine functions in its side chain or primary chain as a starting material, characterized in that the reaction is carried out with an epoxide, a glycidyl ether or a mixture of different epoxides and glycidyl ethers in aqueous solution without additional solvent at a temperature of 30° to 90° C. and at a pH of 8 to 14 within 3 to 30 minutes, the epoxides or glycidyl ethers are added as one batch or in portions, and that after adjusting the pH of the aqueous solution of the cationic polymer, which is >13.5 after the reaction with epoxide or glycidyl ether, using a mineral or carboxylic acid, wherein said cationic polymer is obtained in solution without additional work-up steps.

2. A method according to claim 1, characterized in that a reactor with little or no back-mixing is used for the continuous preparation of the water-soluble, cationic polymer.

3. A method according to claim 1, characterized in that ethylene oxide or propylene oxide is used as the epoxide.

4. A method according to claim 1, characterized in that a reaction product formed from polyacrylonitrile homopolymers or copolymers with an N, N-dialkyl alkanediamine is used as the non-cationic polymer.

5. A method according to claim 1, characterized in that the reaction is carried out with 0.1 to 10 moles of epoxide or glycidyl ether, based on the amine function in the polymer.

6. A method according to claim 1, characterized in that the reaction is carried out with 0.5 to 2 moles of epoxide or glycidyl ether, based on the amine functions in the polymer.

7. A method according to claim 1, characterized in that the reaction takes place at 30° to 60° C.

* * * * *